United States Patent Office 3,173,293

Patented Mar. 16, 1965

3,173,293

WELL TESTING METHOD

Robert E. Eckels, 660 Estes St., Lakewood, Colo.

No Drawing. Filed Dec. 21, 1961, Ser. No. 161,297
10 Claims. (Cl. 73—155)

This invention relates to testing wells during drilling operations, and more particularly to the testing of the fluid content of the circulating fluids of oil wells during drill stem tests and the like.

In drilling a well, there is customarily no visual inspection of the hole, however, information as to what is happening down in the hole is a necessity. The well exploration and production personnel may frequently be confronted with the problem of evalulating productive capabilities and formation properties of the well. One method of ascertaining these properties is by means of a drill stem test recovery. During such drill stem tests oil, gas and water may be recovered from the zone of interest. It is not always possible to exclude the drilling fluid from the test zone so that a certain amount is recovered during the test. In many instances, the question arises whether all or a portion of the water (for oil when used as the liquid of the drilling fluid) recovered during a drill stem test is formation water or filtrate water (filtrate water from the drilling mud itself). On occasions, water recovery is apparently only water from the drilling mud, but it is critical to ascertain if any formation water has also been recovered.

According to the present invention, I have discovered that by adding a dye to the drilling fluid or mud system, it is possible to ascertain different types of information not heretofore available in testing oil wells during drilling. According to the invention, a dye is added to the drilling fluid system a period of time prior to the time that a perspective zone is to be penetrated in the drilling. The time must be adequate to provide thorough mixing and dilution of the dye throughout the drilling fluid system. A standard color sample of the liquid is obtained from a mud sample after the mixing period, and sampling of the filtrate from drilling mud continues periodically while penetrating the prospective formation. The filtrate from each mud sample is then compared to the standard, as well as filtrate samples from the recovery of the drill stem test itself. The time of taking the samples of filtrate are recorded during the drilling and the drill stem test. A comparison of the samples may be determined in percentage of dilution which will indicate whether water (or other liquid) recovered during the drill stem test has filtrate which is all or part of the mud filtrate itself. A refinement of the use of the information correlated with the time interval of the samples from the drill stem test with the pressures measured will provide an accurate measurement of the effective permeability of the section tested.

The test of the invention is particularly applicable to drill stem test analysis; however, it is also applicable to tests during completion and production, in addition to other tests conducted during exploration. It may be used where a determination of water (or liquid) dilution is desired. Thus, during exploration the invention may be used to determine the percentage of invasion water and the percentage of formation water recovered during a drill stem test. The invention may, also, be used concurrently to aid in the determination of the effective formation permeability. The indication of the ability of a formation to receive or give up fluids can be related to future secondary recovery consideration. Also, the invention may be used to indicate formation hygroscopic conditions to assist in determining the probability of oil or gas production. It may, also, aid in identifying a mud block. Where oil is used as a drilling fluid, an oil colorable indicator or dye may be used in the drilling fluid to assist in identifying the oil produced in a drill stem test in a similar manner to the water testing.

In completion and production problems, the invention is applicable for early definition of fracture returns as to new oil or formation water. By using a lyophobic sol oil soluble dye emulsified in water frac, it is possible to determine a time solubility relationship to the hydrocarbon surface exposed by the frac. In the recovery problems, the invention provides a means to qualitatively determine the flood water mixing with the formation water in a test well compared to the control well.

Included among the objects and advantages of the present invention is a process for simply and easily determining the ingress and egress of water and/or oil in a well.

Another object of the invention is to provide a process for providing accurate information as to ingress and egress of water in a formation during a drill stem test.

Another object of the invention is to provide a test means for completion and production testing, and provides means for utilizing oil soluble dyes to determine early definition of fracture returns as to new oil or formation water.

A further object of the invention is to provide a positive means for identifying formation water and/or the hygroscopic nature of the formations in a well being tested.

These and other objects and advantages of the invention may be readily asceratined by the following description and examples.

EXAMPLE I

In a well in the Denver-Julesburg Basin at a depth of approximately 6120 feet a test was commenced so as to penetrate a prospective zone, and within about 80 feet of the total depth. In this particular well, the volume of the mud system was calculated to be approximately 790 barrels. A dilution ratio of a fluorescein dye to be used was predetermined at about 1 pound of dye to 33,500 pounds of water contained in the mud system. For the total 790 barrels, about 7 pounds of a fluorescein dye were mixed in the chemical barrel and added to the mud system over a period of about 2 hours to insure proper mixing and distribution. After all of the dye had been added to the mud, and the mud had circulated sufficiently to provide thorough mixing and distribution of the dye throughout the system, a sample of the mud was taken. Approximately 5 cc. of filtrate was filtered from the mud sample in a standard drilling mud filter press. Immediately prior to adding the fluorescein dye to the mud, a sample of the mud was taken and about 5 cc. of filtrate was obtained in the filter press to provide a reference standard with no dye in the filtrate.

The dye mixing was initiated at about 6120 feet, which depth was about 80 feet above the eventual total depth of the well. Coring operations had just begun in the "J" sand, and filtrate samples from the mud were periodically taken as the zone of interest was penetrated by the coring and drilling. A total of about 8 feet of clay filled, partly reworked, tite sandstone with nearly uniform to spotted stain and fluorescence was recovered in the core. A drill stem test of this interval was run immediately after the core was pulled out, and the recovery from the drill stem test was 40 feet of slightly oil-cut mud. A filtrate sample of this mud was then obtained, labeled and saved for comparative analysis.

The first sample recovered from the system was a reference sample with no dye and the percentage of fluorescein in this sample was 0%. During circulation additional samples of filtrate were taken for comparison. After about two hours of circulating the mud with the contained fluorescein, another sample was taken and this was taken as a filtrate sample with 100% fluorescein and it provides the second standard for comparison with additional samples taken from the drilling procedure or during the drill stem test. A sample of the recovery from the drill stem test was obtained, and after obtaining the filtrate from the filter press, it was compared (as with a Beckman Fluorospectrophotometer) with the two above mentioned standards. The filtrate from the drill stem test was found by color comparison to contain 104% dye, which is slightly higher than the standard showing the 100% dye. This sample came from the mud which is recovered in the drill stem test and was undoubtedly annular fluid between the straddle packers. The slight increase in dye concentration indicates that there is no dilution of the drilling mud and consequently no formation water was present in the test interval. From the information on the dye showing that there was no formation water and the lack of oil or gas recovery it may be concluded that this interval constituted an impermeable barrier.

It is noted that the dye concentration of the test filtrate tends to increase if the formation penetrated is hydroscopic, thereby removing some of the water from the drilling mud.

EXAMPLE II

In a well in the Denver-Julesburg Basin at a depth of about 7035 feet, about 7 pounds of orange fluorescein dye were introduced into the drilling fluid system which was estimated to be 850 barrels. The depth of the well at that point was about 110 feet above the proposed eventual total depth. The dilution ratio of the dye was calculated to be about 1 pound to 40,000 pounds of water contained in the mud.

Filtrate samples were obtained prior to mixing the dye with the mud. After completely mixing the dye with the mud it was recirculated for about twelve and a half hours, during which time the potential zone of interest was penetrated. No coring was done in this well. Two upper benches of the "J" sand were considered prospective. Oil shows were noted in the sample cuttings recovered from the upper portion of the top bench and, also, from the second bench. The major part of the sand cuttings, however, exhibited stain and fluorescence and appeared hard, tight, and silty or clay filled. A straddle packer drill stem test was run on each of the upper two "J" sand benches after a total depth was reached and well logs were run.

After penetrating three feet of the upper bench of the "J" sand, circulation was lost and it was estimated that about 60 to 80 barrels of drilling fluid were lost to this bench before circulation was regained. A small but undetermined additional amount of mud was lost while drilling the remainder of the "J" sand section. While circulating and after reaching total depth, approximately 50 more barrels of fluid were lost to that formation. The following table shows the filtrate dye tests on the well with the date and time run:

| Sample No. | Date and Time, MST | Description | Percent | Remarks |
|---|---|---|---|---|
| 1 | 8/20, 1200 | Reference w/no dye. | 0 | Mixed dye in system fr. 1,400 to 1,600=8/20. |
| 2 | 8/20, 1900 | Reference w/dye | 100 | DST #1 Filtrate comparison reference. |
| 3 | 8/21, 0400 | do | 72 | Av. smpl. #3 and 4 for DST #2 compar. reference. |
| 4 | 8/21, 1330 | do | 100 | |
| 5 | DST | Filtrate fr DST #1 recovery. | 60 | Filtrate unknown before comparison. |
| 6 | DST | Filtrate fr DST #2 recovery. | 64 | Do. |

The laboratory analysis of the filtrate samples was by color comparison of the filtrates in standard optical tubes using a color comparator, such as a Beckman sliding scale Fluoro-spectrophotometer with a Coleman Filter which passed ultraviolet light at a wave length of approximately 3600 Angstrom units. The highest readings on the reference samples were obtained from samples 2 and 4. Consequently, they were used as the 100% dye control standard. Correlation of the filtrate sampling time with the time in which the test intervals were penetrated indicated that sample No. 2 is the best comparison standard for filtrate from the drill stem test No. 1 recovery. Drill stem test No. 1 was a test of the second bench of the "J" sand. An average of the samples Nos. 2 and 3 were used as a comparison reference for the filtrate from the recovery of the drill stem test No. 2, which is a test of the top bench of the "J" sand. The average reference value is calculated to be about 86% and on this basis the dye concentration in the filtrate from the drill stem test No. 1 and drill stem test No. 2 were determined to be 60% and 64% respectively. Both drill stem tests under consideration were straddle packer tests. Fluid recovery from drill stem test No. 1, a test of the second bench, consisted of 548 feet of drilling mud and 651 feet of muddy water. The filtrate sample from drill stem No. 1 was obtained from the muddy water portion of this recovery. Thus it is seen by the dilution of the dye in the filtrate that formation water was unquestionably produced from the test interval, and this interval is neither oil productive nor is it nonporous and impermeable.

The quantity of formation water produced is approximately 40% of the total recovered water, which represents about 260 feet of fill-up in the drill pipe during the known producing period that the test tool was open. This quantity may be calculated in barrels per unit of time or any other desired unit to aid in the calculation of formation properties.

The recovery from the drill stem test No. 2, a test of the top bench of the "J" sand, was 465 feet of drilling mud and 1767 feet of muddy water. As in the case of the previous drill stem test, the filtrate sample was obtained from the recovered muddy water. A failure in the bottom packer during the test leads to the assumption that the recovery was from both the first and second benches. The dye concentration from this drill stem test filtrate sample was about 64% by laboratory measurement and comparison with the known samples. The same conclusions may be drawn with respect to both drill stem tests under consideration. In the case of drill stem test No. 2, 36% of the total water recovery, representing about 636 feet of fill-up in the drill pipe, is considered to be formation water produced from the two zones during the test period. The increased formation water recovery as compared to drill stem test No. 1 is assumed to have been produced by the top bench which was not included in the test interval of drill stem test No. 1.

One effective dye for the system is the disodium salt of fluorescein which is di-sodium 9-o-carboxyphenyl-6-hydroxy-3-isoxanthone (uranine, uranine yellow, resorcinolphthalein). Fluorescein provides excellent comparison color in ultraviolet light, and by using a controlled wave length, comparative tests may be made from well to well using essentially the same dilution.

Dyes which may be used in the process are the dyes which have reasonable permanency when exposed to light, air and the ingredients of the mud. Also, the dye is preferably not soluble in oil when it is used with a water base drilling fluid, and is soluble in oil and insoluble in water when used with an oil base drilling fluid. The dyes should have reasonably good resolution on dilution so that a simple and accurate comparative test may be made. This provides a fast and accurate means for field determination of dilution or concentration of the dye in the various filtrates. Fluorescein is satisfactory in a dilution range of about 1 part by weight of the dye to from 20,000 to 100,000 parts by weight of water, and preferably in the 25,000 to 50,00 parts by weight of water.

The fluorescein dye of the specific examples provides a general color or dilution code index as set forth in the following table at the approximate dilutions indicated, and with the color indicated for the particular dilution. By using a spectrophotometer, however, and with a uniform wave length a very accurate color scale may be used. As pointed out above, the color scale may be readily correlated to dilution, which may be specified either on a weight of dye basis or on the basis of percentage of the standard as shown in the two tests above.

Other dyes may be used, and the usable dyes must have good resolution at the high dilutions in which they are used. Dyes which are readily compared by such instruments as a spectrophotometer are usually the lighter colored dyes, as red, orange, yellow, etc. The darker dyes as black, blue, etc. are not preferred since they are not easily compared.

Fluorescence substances which are preferentially soluble in the liquid base of the well circulating fluid and generally those excited by visible light (substances having photoluminescence) are the preferred "dye" substances, and specifically those excited by ultraviolet light. It is, of course, necessary that the fluorescent substance be soluble in the liquid base of the circulating fluid in the amount present in the liquid. A substantial number of substances are available and many tables of such substances with their characteristic color, solubility, etc. are currently published, one such publication is "The Handbook of Chemistry and Physics," Forty-second Edition, by The Chemical Rubber Publishing Co., Cleveland, Ohio, pages 3003–3014. The substance used as the color indicator must be compatible (generally inert) with the circulating fluid and the recoverey. Economics will, in general, limit the use substances to those which are readily available and not so costly as to make the test uneconomical in relation to the benefit. The fluorescent substances include organic, inorganic and metal-organic compounds, and include a sufficient range of solubilities, color characteristics, compatibilities to meet any condition.

The color index table for fluorescein is derived by adding water to an original solution of a certain concentration. The concentration is determined for each dilution and the color is observed. A spectrophotometer, of course, will provide a very exact scale. For a quick field test such a table is useful.

*Table I*

COLOR INDEX FOR FLUORESCEIN DYE

| | Color | Dilution, Dye/Water in Pounds |
|---|---|---|
| 1 | Dark Orange | 1/140.8 |
| 2 | Medium Dark Orange w/Green Diagonal | 1/563.2 |
| 3 | Light Orange | 1/2,252.8 |
| 4 | Dark Yellow | 1/9,011.2 |
| 5 | Yellow | 1/36,044.8 |
| 6 | Light Yellow | 1/144,176.2 |
| 7 | Very Light Yellow Clear | 1/576,704.8 |
| 8 | Clear w/Yellow Cast | 1/2,306,819.2 |

A similar color-dilution table may be readily prepared for any dye, with a water base or any other liquid which may be used in a circulating mud.

While the invention has been described in relation to specific embodiments there is no intent to limit the spirit and scope of the invention to the precise details, except as defined in the following claims.

I claim:

1. The method of testing for a loss or gain in the liquid content of a circulating fluid in a well having a circulating fluid system, comprising adding to the fluid system a predetermined quantity of a dye soluble in liquid of the fluid system, mixing and distributing the dye substantially uniformly throughout the body of the fluid system, obtaining a filtrate sample from the fluid system with the incorporated dye as a standard, determining the amount of dye in the standard filtrate, isolating a portion of the well bore from the remainder thereof, thereafter recovering a portion of the fluid contained in said isolated portion, obtaining a filtrate sample of the recovery fluid, determining the amount of dye in said recovery fluid filtrate sample, and then comparing the amounts of dye in each sample.

2. A method of testing for a loss or gain in the liquid content of the circulating fluid in a well having a water base circulating fluid system, comprising adding to the fluid system a predetermined quantity of a water soluble dye, mixing the dye with the circulating fluid system over a substantial period of time so as to distribute the dye uniformly throughout the body of the fluid system, obtaining an aqueous filtrate sample from the fluid system with the dye incorporated therein as a standard, measuring the concentration of the dye in the filtrate of the standard, isolating a portion of the well bore from the remainder thereof, conducting an invasion test on said isolated portion of the bore in said well, then recovering a portion of the fluid contained in said isolated portion after said invasion test, obtaining an aqueous filtrate sample of said recovery fluid measuring the dilution of the dye in said recovery fluid filtrate sample, and then comparing the amounts of dye in said samples.

3. A method according to claim 2 in wihch the dye is fluorescein.

4. A method according to claim 3 in which the dye is added in an amount to make a dilution of 1 part of dye to from 25,000 to 50,000 parts of water.

5. A method of testing for water gain or loss in the circulating mud of an exploration well having a water base circulating mud system, comprising adding to the circulating mud a quantity of fluorescein in an amount of about one part of dye to 25,000 to 50,000 parts by weight of water in the mud, mixing the mud and dye for a sufficient period of time to distribute the dye substantially uniformly throughout the body of the circulating mud, filtering a sample of the mud with the dye to obtain a first filtrate, measuring the concentration of said fluorescein in said first filtrate, isolating a portion of the well bore from the remainder thereof, conducting a drill stem test in said isolated portion of the bore in said well, recovering a portion of the mud in said isolated portion after said drill stem test, filtering a sample of the recovery mud to obtain a second filtrate, measuring the concentration of the fluorescein in said second filtrate, and then comparing the concentration of said fluorescein in said samples.

6. A method for testing for a loss or gain of liquid in a well having a circulating fluid system which includes a carrier liquid and suspended solids, comprising obtaining a first sample of the circulating fluid clarifying said first sample of circulating fluid of its solid matter, adding a predetermined amount of an indicating material to the circulating fluid system and then mixing the said circulating fluid to distribute the indicating material throughout the fluid system, said indicating material being foreign to the circulating system and readily identifiable therefrom, separating a second sample of circulating fluid with the incorporated indicating material, clarifying said second sample of circulating fluid of its solid matter, measuring the concentration of said indicating material in said clarified second sample, isolating a portion of the bore of the well, thereafter obtaining at least one recovery sample of recovery fluid from said isolated portion of the bore, clarifying said at least one recovery sample of solid matter, measuring the concentration of said indicating material in said at least one clarified recovery sample, and then comparing the concentration of indicating material in said samples.

7. A method of testing for a loss or gain of liquid in a well having a circulating fluid system which includes a carrier liquid and suspended solids, comprising adding a predetermined amount of an indicating material to the circulating fluid and then mixing and circulating the circulating fluid to distribute the indicating material throughout the fluid system, said indicating material being foreign to the circulating system and readily identifiable therefrom, obtaining a first sample of circulating fluid with the incorporated indicating material, clarifying said first sample of its solid matter, measuring the concentration of said indicating material in said first sample, isolating a portion of the bore of the well from the remainder thereof, thereafter obtaining at least one recovery sample of the recovery fluid in said isolated portion of said bore, clarifying said at least one recovery sample of its solid matter, measuring the concentration of indicating material in said at least one clarified recovery sample, and then comparing the concentrations of indicating material in said samples.

8. A method of testing for a loss or gain of liquid in a well having a circulating fluid system which includes a carrier liquid and suspended solids, comprising adding a predetermined amount of an indicating material to the circulating fluid and then mixing and circulating the circulating fluid to distribute the indicating material throughout the fluid system, said indicating material being foreign to the circulating system and readily identifiable therefrom, obtaining a first sample of circulating fluid with the incorporated indicating material, clarifying said first sample of its solid matter, measuring the concentration of said indicating material in said first clarified sample, isolating a portion of the bore of the well from the remainder thereof, thereafter periodically obtaining a plurality of recovery samples of the recovery fluid in said isolated portion of said bore, clarifying said recovery samples of solid matter, measuring the concentration of indicating material in said clarified recovery samples, and then comparing the concentrations of indicating material in all said samples.

9. In a testing procedure for testing for a loss or gain of carrier liquid of a well having a circulating fluid system which includes a carrier liquid, the method of preparing samples for such testing which comprises adding a predetermined amount of an indicating material to the circulating fluid system, distributing said indicating material uniformly throughout the fluid system, said indicating material being foreign to the circulating fluid system and readily identifiable therefrom, obtaining a first sample of the circulating fluid with the incorporated indicating material, determining the amount of indicating material in said first sample, isolating a portion of the well bore from the remainder thereof, conducting a test on the well while circulating said fluid system therein, obtaining at least one sample of recovery fluid contained from said isolated portion, determining the amount of indicating material in said at least one sample of recovery fluid, and then comparing the amounts of indicating material in each said sample.

10. In a testing procedure for testing for a loss or gain of carrier liquid of a well having a circulating fluid system which includes a carrier liquid and suspended solids, the method of preparing samples for such testing which comprises adding a predetermined amount of a carrier liquid soluble indicating material to the circulating fluid system and then mixing and circulating the circulating fluid system to substantially uniformly distribute the indicating material throughout the circulating fluid system, said indicating material being foreign to the circulating system and readily identifiable therefrom, obtaining a first sample of said circulating fluid system with incorporated indicating material, removing the carrier liquid with its incorporated indicating material from the included solids, determining the amount of indicating material in said first sample, isolating a portion of the well bore from the remainder thereof and conducting a test on the well while circulating the circulating fluid system therein, then obtaining at least one recovery sample of the recovery fluid from said isolated portion, then removing the carrier liquid with the incorporated indicating material from the included solids of each such sample obtained, determining the amount of indicating material in the carrier liquid of said at least one recovery sample, and then comparing the amounts of indicating material in each said sample.

References Cited by the Examiner

UNITED STATES PATENTS

| | | | |
|---|---|---|---|
| 1,994,761 | 3/35 | Ennis | 23—230 X |
| 2,348,639 | 5/44 | O'Brien | 23—230 X |
| 2,660,887 | 12/53 | Frei | 73—155 |

CHARLES E. O'CONNELL, *Primary Examiner.*

BENJAMIN BENDETT, *Examiner.*